US009624894B2

(12) United States Patent
Shoda et al.

(10) Patent No.: US 9,624,894 B2
(45) Date of Patent: Apr. 18, 2017

(54) AUTOMATIC STOPPING AND RESTARTING DEVICE OF INTERNAL COMBUSTION ENGINE

(71) Applicant: Mitsubishi Electric Corporation, Tokyo (JP)

(72) Inventors: Tomohisa Shoda, Tokyo (JP); Osamu Ishikawa, Tokyo (JP); Takeru Okabe, Tokyo (JP); Hiroaki Kitano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 105 days.

(21) Appl. No.: 14/758,271

(22) PCT Filed: May 15, 2013

(86) PCT No.: PCT/JP2013/063493
§ 371 (c)(1),
(2) Date: Jun. 29, 2015

(87) PCT Pub. No.: WO2014/184889
PCT Pub. Date: Nov. 20, 2014

(65) Prior Publication Data
US 2015/0345457 A1  Dec. 3, 2015

(51) Int. Cl.
F02N 11/00 (2006.01)
F02N 11/08 (2006.01)
(Continued)

(52) U.S. Cl.
CPC .......... F02N 11/0833 (2013.01); F02D 17/04 (2013.01); F02D 29/02 (2013.01);
(Continued)

(58) Field of Classification Search
CPC ............ F02N 11/0083; F02N 11/0084; F02N 2200/022; F02D 41/0097; F02D 41/30;
(Continued)

(56) References Cited

U.S. PATENT DOCUMENTS 4,362,133 A * 12/1982 Malik ..................... F16D 48/08
123/179.16
8,196,558 B2 * 6/2012 Okumoto ............ F02N 11/0844
123/179.25

(Continued)

FOREIGN PATENT DOCUMENTS

JP  2010-185425 A  8/2010
JP  2010-255548 A  11/2010

(Continued)

OTHER PUBLICATIONS

International Search Report for PCT/JP2013/063493 dated Jun. 11, 2013.

Primary Examiner — Carlos A Rivera
Assistant Examiner — Sherman Manley
(74) Attorney, Agent, or Firm — Sughrue Mion, PLLC; Richard C. Turner

(57) ABSTRACT

In an automatically stopped internal combustion engine, a rotation speed at next and subsequent ignition timings is predicted at every ignition timing of the internal combustion engine after the internal combustion engine is stopped automatically. Whether self-restorable restarting is allowed is determined according to a comparison result of the predictive rotation speed and a self-restoration determination rotation speed, so that self-restorable restarting is performed in a reliable manner.

7 Claims, 13 Drawing Sheets

(51) Int. Cl.
*F02D 41/30* (2006.01)
*F02D 41/00* (2006.01)
*F02D 29/02* (2006.01)
*F02D 17/04* (2006.01)
*F02N 99/00* (2010.01)

(52) U.S. Cl.
CPC ....... *F02D 41/009* (2013.01); *F02D 41/0097* (2013.01); *F02D 41/30* (2013.01); *F02N 11/0844* (2013.01); *F02N 99/004* (2013.01); *F02N 99/006* (2013.01); *F02N 2200/022* (2013.01); *Y02T 10/48* (2013.01)

(58) Field of Classification Search
CPC ........ F02D 41/009; F02D 17/04; F02D 29/02; F02D 99/004; F02D 99/006; Y02T 10/48
See application file for complete search history.

(56) References Cited

U.S. PATENT DOCUMENTS

| | | | | |
|---|---|---|---|---|
| 8,813,547 | B2* | 8/2014 | Cwik | F02N 11/0855 73/115.05 |
| 2003/0041831 | A1* | 3/2003 | Aoki | B60K 6/485 123/179.4 |
| 2005/0228575 | A1* | 10/2005 | Murakami | F02D 41/042 701/112 |
| 2011/0172901 | A1* | 7/2011 | Okumoto | F02N 11/0818 701/113 |
| 2011/0178695 | A1* | 7/2011 | Okumoto | F02N 11/0844 701/103 |
| 2011/0184626 | A1* | 7/2011 | Mauritz | F02N 11/0855 701/102 |
| 2011/0202254 | A1* | 8/2011 | Ishikawa | F02D 17/04 701/103 |
| 2011/0277728 | A1* | 11/2011 | Schoenek | F02D 41/042 123/320 |

FOREIGN PATENT DOCUMENTS

| | | |
|---|---|---|
| JP | 5059043 B2 | 10/2012 |
| WO | 2010/092888 A1 | 8/2010 |

* cited by examiner

AUTOMATIC STOPPING AND RESTARTING DEVICE OF INTERNAL COMBUSTION ENGINE

TECHNICAL FIELD

The present invention relates to an automatic stopping and restarting device of an internal combustion engine configured to automatically stop the internal combustion engine when predetermined automatic stopping conditions are established and to automatically restart the internal combustion engine later when predetermined restarting conditions are established.

BACKGROUND ART

An automatic stopping and restarting device (so-called idling stopping device) of an internal combustion engine is adopted by some types of vehicles in the related art with the aim of improving fuel consumption and reducing environmental burdens. The automatic stopping and restarting device of an internal combustion engine automatically stops the internal combustion engine from running when predetermined automatic stopping conditions are established according to an operation by the driver to decelerate or stop the vehicle while the internal combustion engine is running and also automatically restarts the internal combustion engine when predetermined restarting conditions are established according to an operation by the driver to start or accelerate the vehicle.

As such an automatic stopping and restarting device of an internal combustion engine, a device configured as follows is proposed. That is, in a case where a rotation speed of the internal combustion engine when the restarting conditions are established is higher than a predetermined rotation speed, the internal combustion engine is restarted only by restarting fuel injection, that is, self-restorable restarting is performed whereas when a rotation speed of the internal combustion engine when the restarting conditions are established is lower than the predetermined rotation speed, a starting device (starter) is driven, so that the starting device (starter) is driven less frequently when the internal combustion engine is restarted.

PTL 1 describes that the internal combustion engine is restarted only by restarting fuel injection, that is, self-restorable restarting is performed in a case where a rotation speed of the internal combustion engine when restarting is requested is as high as or higher than a starter necessity determination value which is preliminarily set in consideration of a rotation decrease amount over a range from a crank angle when the restarting is requested to a compression angle position of a combustion cylinder after the restarting is requested.

CITATION LIST

Patent Literature

PTL 1: Japanese Patent No. 5059043

SUMMARY OF INVENTION

Technical Problem

Incidentally, after the internal combustion engine is automatically stopped, a rotation speed of the internal combustion engine does not necessarily decrease by a certain amount in every occasion and a decrease amount varies with states of the internal combustion engine. In addition, even when the running states of the internal combustion engine are the same, a decrease amount of the rotation speed also varies in a case where the rotation speed when the internal combustion engine is automatically stopped is different or in a case where the state of the internal combustion engine changes while the rotation speed is decreasing. Hence, in order to set the starter necessity determination value in consideration of a rotation decrease amount of the internal combustion engine as in the related art, it is necessary to understand an exact rotation decrease amount in various running states and automatically stopped states. It is also necessary to set the determination value on the assumption that a rotation decrease amount is large.

However, when the determination value is set by assuming that a rotation decrease amount is large, a determination to inhibit self-restorable restarting may be made in a case where the state of the internal combustion engine changes while the rotation speed is decreasing, for example, in a case where a rotation decrease amount becomes small while the rotation speed is decreasing. In other words, even when self-restorable restarting is allowed because a rotation decrease amount of the rotation speed becomes small after the restarting conditions are established, the internal combustion engine has to wait for a restarting operation until the driving of the starter begins. Hence, not only may a restarting time be delayed, but also the starter may be driven more frequently.

The invention was devised in view of the problems discussed above and has an object to provide an automatic stopping and restarting device of an internal combustion engine capable of making a determination correctly for an automatically stopped internal combustion engine as to allowance of self-restoration by which the internal combustion engine is restarted only by supplying fuel so that the internal combustion engine is restarted in a reliable manner only by fuel injection, and also capable of determining a necessity of driving of the starting device appropriately so that the starting device is driven only when it is necessary to drive the starting device to restart the internal combustion engine.

Solution to Problem

An automatic stopping and restarting device of an internal combustion engine according to a first aspect of the invention is an automatic stopping and restarting device of an internal combustion engine configured to automatically stop the internal combustion engine when predetermined automatic stopping conditions are established while the internal combustion engine is running and to restart the internal combustion engine when predetermined restarting conditions are established while the internal combustion engine is in an automatically stopped period. This automatic stopping and restarting device includes: crank angle detection means for detecting a crank angle of the internal combustion engine; rotation speed computation means for computing a rotation speed of the internal combustion engine; fuel injection control means for restarting fuel injection to a predetermined cylinder after the restarting conditions are established; ignition-timing internal combustion engine rotation speed prediction means for predicting a rotation speed of the internal combustion engine at ignition timing after the internal combustion engine is automatically stopped; and self-restoration allowance determination means for determining whether self-restoration of the internal combustion engine is allowed according to a comparison result of a predictive rotation speed of the internal combustion engine at the ignition timing and a pre-set self-restoration determination rotation speed.

An automatic stopping and restarting device of an internal combustion engine according to a second aspect of the invention is characterized in that the predictive rotation speed of the internal combustion engine at the ignition timing is an initial combustion rotation speed which is a rotation speed of the internal combustion engine at ignition timing at which initial combustion of fuel injected into a predetermined cylinder by the fuel injection control means according to timing when the restarting conditions are established takes place.

An automatic stopping and restarting device of an internal combustion engine according to a third aspect of the invention is characterized in that the ignition-timing internal combustion engine rotation speed prediction means computes the initial combustion rotation speed using a predictive rotation speed that takes a variation of rotation energy of the internal combustion engine into account.

An automatic stopping and restarting device of an internal combustion engine according to a fourth aspect of the invention is characterized in that the ignition-timing internal combustion engine rotation speed prediction means makes a first prediction of the predictive rotation speed using the rotation energy of the internal combustion engine after the internal combustion engine is automatically stopped as an initial value.

An automatic stopping and restarting device of an internal combustion engine according to a fifth aspect of the invention is characterized in that the self-restoration determination rotation speed is determined on the basis of at least one of a water temperature, an intake pipe pressure, and a rotation load of the internal combustion engine.

An automatic stopping and restarting device of an internal combustion engine according to a sixth aspect of the invention is characterized in that when the self-restoration allowance determination means determines that self-restoration is allowed and an increase amount of the rotation speed of the internal combustion engine from ignition timing of initial combustion is smaller than a pre-set self-restoration determination rotation speed correction necessity determination value, a necessity of a correction on the self-restoration determination rotation speed is determined and a predetermined correction coefficient is added to the self-restoration determination rotation speed.

An automatic stopping and restarting device of an internal combustion engine according to a seventh aspect of the invention is characterized in that the self-restoration determination rotation speed correction necessity determination value is determined on the basis of at least one of a water temperature, an intake pipe pressure, and a rotation load of the internal combustion engine.

Advantageous Effects of Invention

According to the first through fourth aspects of the invention, whether restarting of the internal combustion engine by self-restoration is allowed is determined according to a comparison result of a predictive rotation speed at ignition timing of the internal combustion engine after the internal combustion engine is automatically stopped and a pre-set self-restoration determination rotation speed. Hence, self-restorable restarting can be performed in a reliable manner. Also, by predicting the rotation speed at ignition timing of initial combustion since the restarting conditions are established, self-restorable restarting is performed with the rotation speed at the initial combustion being understood. Hence, the occurrence of a failure of the self-restorable restarting can be prevented. Further, a rotation speed is predicted using rotation energy of the internal combustion engine after the internal combustion engine is automatically stopped as an initial value. Hence, the rotation speed can be predicted with accuracy from the initial rotation speed.

According to the fifth aspect of the invention, the self-restoration determination rotation speed is determined on the basis of information on at least one of a water temperature, an intake pipe pressure, and a rotation load of the internal combustion engine. Hence, because the state of the internal combustion engine can be taken into account, whether the self-restorable restarting is allowed or not can be determined more accurately.

According to the sixth aspect of the invention, when a rotation increase by initial combustion after the restarting conditions are established is poor and an increase amount is smaller than the self-restoration determination correction necessity determination value, the self-restoration determination rotation speed is corrected to a higher value. Hence, the occurrence of a failure of the self-restorable restarting due to deterioration of the internal combustion engine can be prevented.

According to the seventh aspect of the invention, the self-restoration determination rotation speed correction necessity determination value is determined on the basis of information on at least one of a water temperature, an intake pipe pressure, and a rotation load of the internal combustion engine. Hence, because the state of the internal combustion engine can be taken into account, whether the self-restorable restarting is allowed or not can be determined more accurately.

DESCRIPTION OF EMBODIMENTS

First Embodiment

Figure 1:
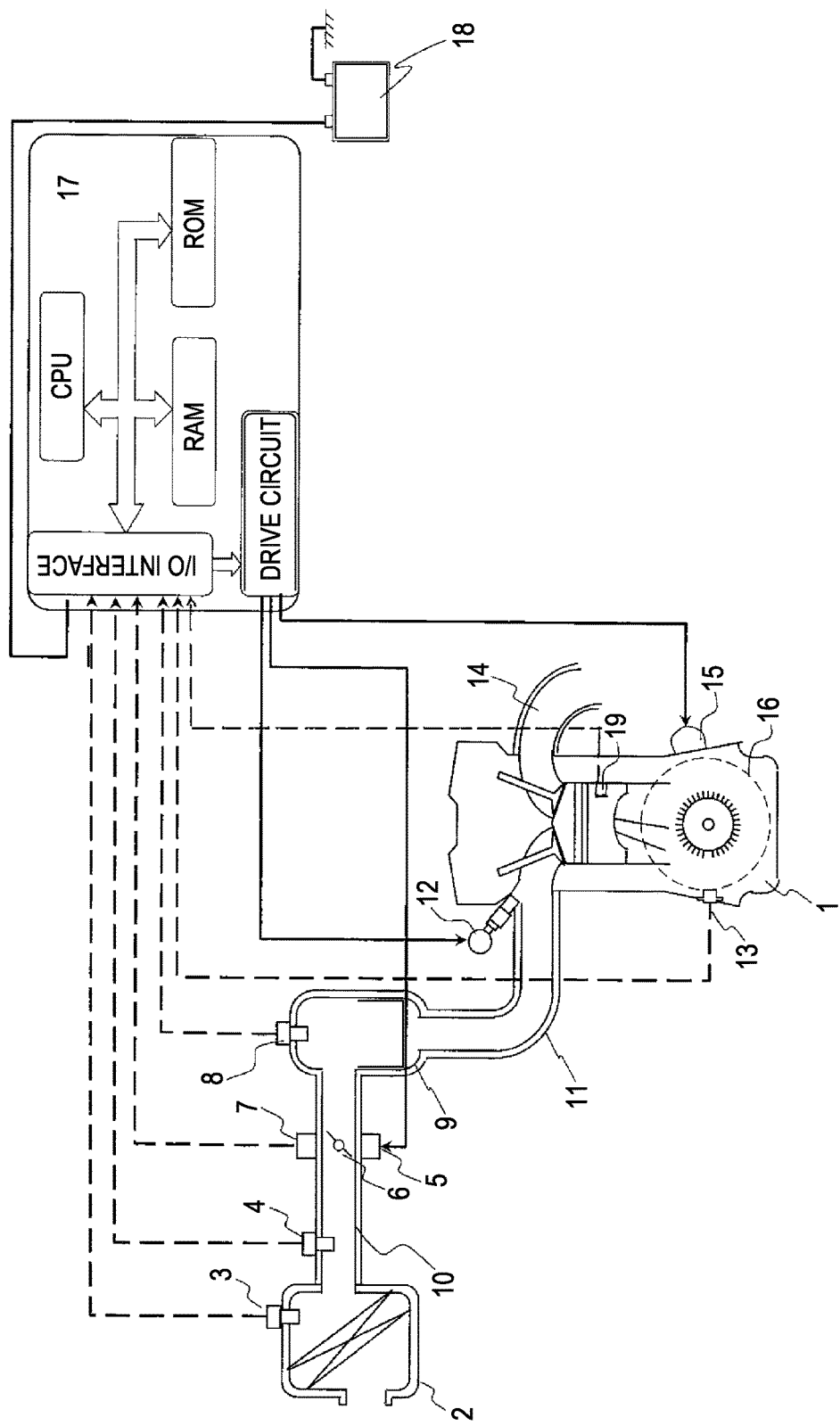
FIG. 1 is a view showing a configuration of an internal combustion engine according to an embodiment of the invention.

Hereinafter, an embodiment of the invention will be described using the drawings. FIG. 1 is a view showing a configuration of an automatic stopping and restarting device of an internal combustion engine to which the invention is applied. Referring to FIG. 1, numeral 1 denotes an internal combustion engine (hereinafter, referred to as the engine 1), and air supplied to the engine 1 is supplied to respective cylinders of the engine 1 via an air filter 2, an intake pipe 10, a surge tank 9, and an intake manifold 11. The air filter 2 is provided with an intake temperature sensor 3 that detects a temperature of incoming air. The intake pipe 10 is provided with an airflow sensor 4 that detects an air amount of the incoming air. A throttle valve 6 that is operated by a motor 5 to control a flow rate of the incoming air and a throttle opening sensor 7 that detects a degree of opening of the throttle valve 6 are provided downstream of the airflow sensor 4. The surge tank 9 is provided with an intake pipe pressure sensor 8 that detects an intake pressure inside the surge tank 9.

Fuel supplied to the engine 1 is supplied by a fuel injection valve 12 provided in the vicinity of an intake port of each cylinder of the engine 1 to form an air-fuel mixture with the air supplied as above, and the air-fuel mixture is sucked into a combustion chamber of each cylinder of the engine 1. Combustion takes place when the air-fuel mixture sucked in the combustion chamber is ignited by a spark plug (not shown). A combustion gas generated as a result of combustion passes through an exhaust pipe 14 and is released to atmosphere after a noxious gas is purified by a catalytic device (not shown).

The engine 1 is provided with a ring gear 16 coupled to crank shafts of a starter 15 and the engine 1. When the engine 1 is key-started or restarted with the need of driving the starter 15, cranking of the engine 1 is started with the rotary driving of the ring gear 16 by the starter 15.

Further, the engine 1 is provided with a water temperature sensor 19 that detects a temperature of cooling water of the engine 1 and a crank angle sensor 13 that detects a crank angle of the engine 1. An engine control unit (hereinafter, abbreviated to the ECU 17) computes a crank angle, a rotation speed, and so on of the engine 1 on the basis of output signals from the water temperature sensor 19 and the crank angle sensor 13.

The ECU 17 is formed of an input and output interface via which to input signals outputted from the respective sensors described above, detection signals of a depressing amount of an unillustrated accelerator pedal, a depressing amount of an unillustrated brake, and so on, a CPU (micro-processor) that performs various computations to control the engine 1 and sends a drive signal to a drive circuit, a ROM (Read Only Memory) that stores control programs and various constants used for various computations by the CPU, a RAM (Random Access Memory) that temporarily stores a result of computations by the CPU, and the drive circuit that sends a drive signal to the fuel injection valves 12, the starter 15, and so on according to a computation result from the CPU. Power is supplied to the ECU 17 from a battery 18 via the input and output interface.

The ECU 17 also determines whether automatic stopping conditions and restarting conditions of the engine 1 of the invention are established and performs a computation for a determination regarding self-restoration when a request of restarting is established. Also, on the basis of an output signal of the crank angle sensor 13, the ECU 17 performs computations so that the crank angle crk has a minimal value at the compression top dead center of each cylinder and the crank angle crk has a maximal value after the compression top dead center. Further, the ECU 17 calculates a rotation speed Ne of the engine 1 and determines whether the start 15 is to be driven when the engine 1 is key-started or restarted.

Figure 2:
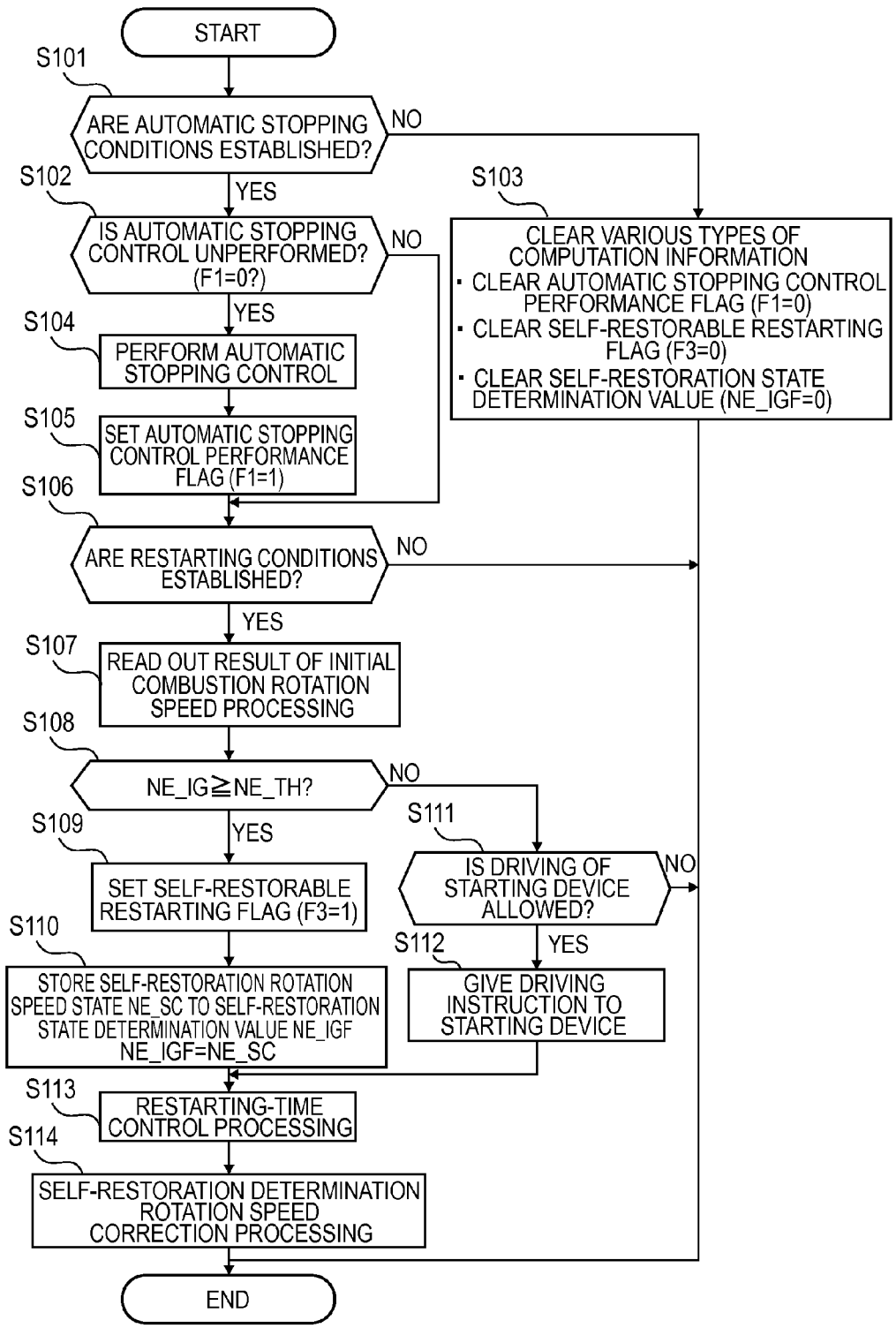
FIG. 2 is a control flowchart of an automatic stopping and restarting device of an internal combustion engine according to the embodiment of the invention.

The invention will now be described in detail using FIG. 2 through FIG. 10. FIG. 2 is a control flowchart in accordance with which automatic stopping and restarting processing of the engine 1 of the invention is performed. Herein, a computation is performed at a constant period (for example, at a period of 10 msec) by the ECU 17.

When the control flowchart of FIG. 2 is commenced, whether the automatic stopping conditions are established is determined in S101. The automatic stopping conditions of the engine 1 are information used to determine an operation by the driver to decelerate or stop the vehicle, such as information specifying, for example, whether a detection temperature of the water temperature sensor 19 is as high as or higher than a predetermined temperature (for example, 60 degrees), whether a detected vehicle speed has reached or exceeded a predetermined speed (for example, 12 km/h) at least once, whether a current vehicle speed is as high as or higher than a predetermined speed (for example, 0 km/h), whether the brake pedal is depressed, or whether a depressing amount of the accelerator pedal is equal to or less than a predetermined value (for example, no depressing amount). A determination is made in S101 by considering these individual pieces of information together.

In a case where at least one condition out of the automatic stopping conditions is not established in S101, a determination of No is made and advancement is made to S103. Here, the processing is ended by clearing an automatic stopping control performance flag (F1=0 (zero)), clearing a self-restorable restarting flag (F3=0 (zero)), and clearing a self-restoration state determination value (NE_IGF=0 (zero)).

Meanwhile, in a case where the automatic stopping conditions are established in S101, a determination of Yes is made and advancement is made to S102. When advancement is made to S102, a determination is made next as to whether automatic stopping control is unperformed. The determination in S102 is made according to the automatic stopping control performance flag (F1) which is set after the automatic stopping control described below is performed. Naturally, the automatic stopping control has not been performed according to the computation in first S102 since the automatic stopping conditions are established. Hence, advancement is made to S104. On the contrary, the automatic stopping control flag described below is set (F1=1) by the computation in second or subsequent S102 since the automatic stopping conditions are established. Hence, a determination of No is made in S102 and advancement is made to S106.

When advancement is made to S104 because a determination of Yes is made by the computation in first S102, the automatic stopping control is performed. By the automatic stopping control, a supply of fuel to the engine 1 is stopped by stopping a drive signal to the fuel injection valves 12, and also a control amount, for example, of the throttle valve 6 is changed. In addition, control to open the clutch of the transmission equipped to the engine 1 is performed. When the automatic stopping control involving these actions is ended, advancement is made to S105. Here, the automatic stopping control performance flag is set (F1=1) and advancement is made to S106.

When advancement is made to S106, whether the restarting conditions are established is determined next. The restarting conditions are information used to determine an intention of the driver to start or accelerate the vehicle, such as information specifying whether a depressing amount of the brake pedal is equal to or less than a predetermined amount (for example, no depressing amount), and whether the accelerator pedal has a value equal to or larger than a predetermined value (for example, a depressing amount accounting for 10% or more of the whole depressing way), and state information of the battery 18 that supplies power to sensors, such as the intake temperature sensor 3, equipped to the engine 1. A determination regarding the restarting conditions is made in S106 by considering these individual pieces of information together.

In a case where the restarting conditions are established in S106, a determination of Yes is made and advancement is made to S107. In a case where at least one condition out of the restarting conditions is not established, a determination of No is made and the processing is ended. When advancement is made to S107, a result of self-restoration determination rotation speed processing is read out and advancement is made to S108. The result of the self-restoration determination rotation speed processing read out in S107 is the information (initial combustion rotation speed NE_IG) used in S108 described below. The self-restoration determination rotation speed processing is performed in accordance with the control flowchart depicted in FIG. 5 and will be described in detail after FIG. 2 is described.

Figure 4:
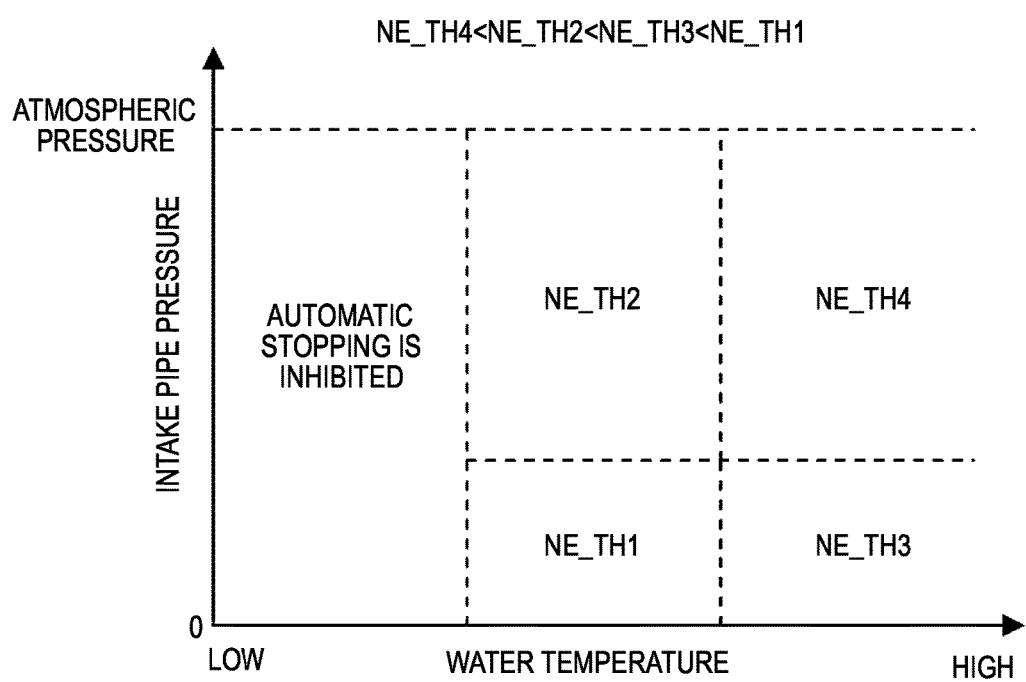
FIG. 4 is a view showing a setting example of a self-restoration determination rotation speed according to the embodiment of the invention.

When advancement is made to S108, the initial combustion rotation speed NE_IG read out in S107 is compared with a self-restoration determination rotation speed NE_TH. The self-restoration determination rotation speed NE_TH is a lower limit value of a rotation speed at or above which combustion can take place by ignition without the aid of the starter 15, and is set, for example, to 400 r/min. Alternatively, the self-restoration determination rotation speed NE_TH may be calculated from a map as shown in FIG. 4 according to states of the engine 1, such as a water temperature, an intake pipe pressure, and a rotation load of the engine 1 when the restarting conditions are established. FIG. 4 shows the water temperature in the abscissa and the intake pipe pressure in the ordinate of the engine 1. Taking into account that combustion when the engine 1 is restarted by self-restoration, becomes more unstable as the water temperature of the engine 1 becomes closer to the automatic stopping inhibited conditions, the self-restoration determination rotation speed NE_TH is set to a higher value as the water temperature of the engine 1 becomes closer to the automatic stopping condition, and also is set lower as the intake pipe pressure becomes higher.

In a case where the initial combustion rotation speed NE_IG is as high as or higher than the self-restoration determination rotation speed NE_TH in S108, a determination of Yes is made, more specifically, restarting by self-restoration is allowed and advancement is made to S109. Here, the self-restorable restarting flag is set (F3=1) and advancement is made to S110. Here, a self-restoration rotation speed state NE_SC when it is determined to allow the self-restorable restarting is stored as the self-restoration state determination value NE_IGF and advancement is made to S113. The self-restoration rotation speed state NE_SC used in S110 will be described in detail below with reference to FIG. 5.

Meanwhile, in a case where a determination of No is made, that is, when it is determined that restarting by self-restoration is inhibited in S108, advancement is made to S111. Here, a determination is made as to whether driving of the starting device (starter 15) is allowed. The determination is made in S111 depending on whether the rotation speed Ne of the engine 1 is within a range of the driving enabling rotation speed of the starter 15, and so on. In a case where it is determined that the driving of the starter 15 is allowed, a determination made in S111 is a determination of Yes. Hence, advancement is made to S112. Here, a driving instruction is given to the starting device (starter 15) and advancement is made to S113. In a case where the driving of the starting device (starter 15) is not allowed in S111, a determination of No is made and the processing is ended.

When advancement is made to S113, the restarting-time control processing is performed next. The restarting-time control processing involves processing to change a control amount of the throttle valve 6 to a control amount at the time of restarting or processing to restart injection of fuel from the combustion infective valves 12. Initial fuel injection timing and initial combustion timing of the invention will now be described using FIG. 3.

Figure 3:
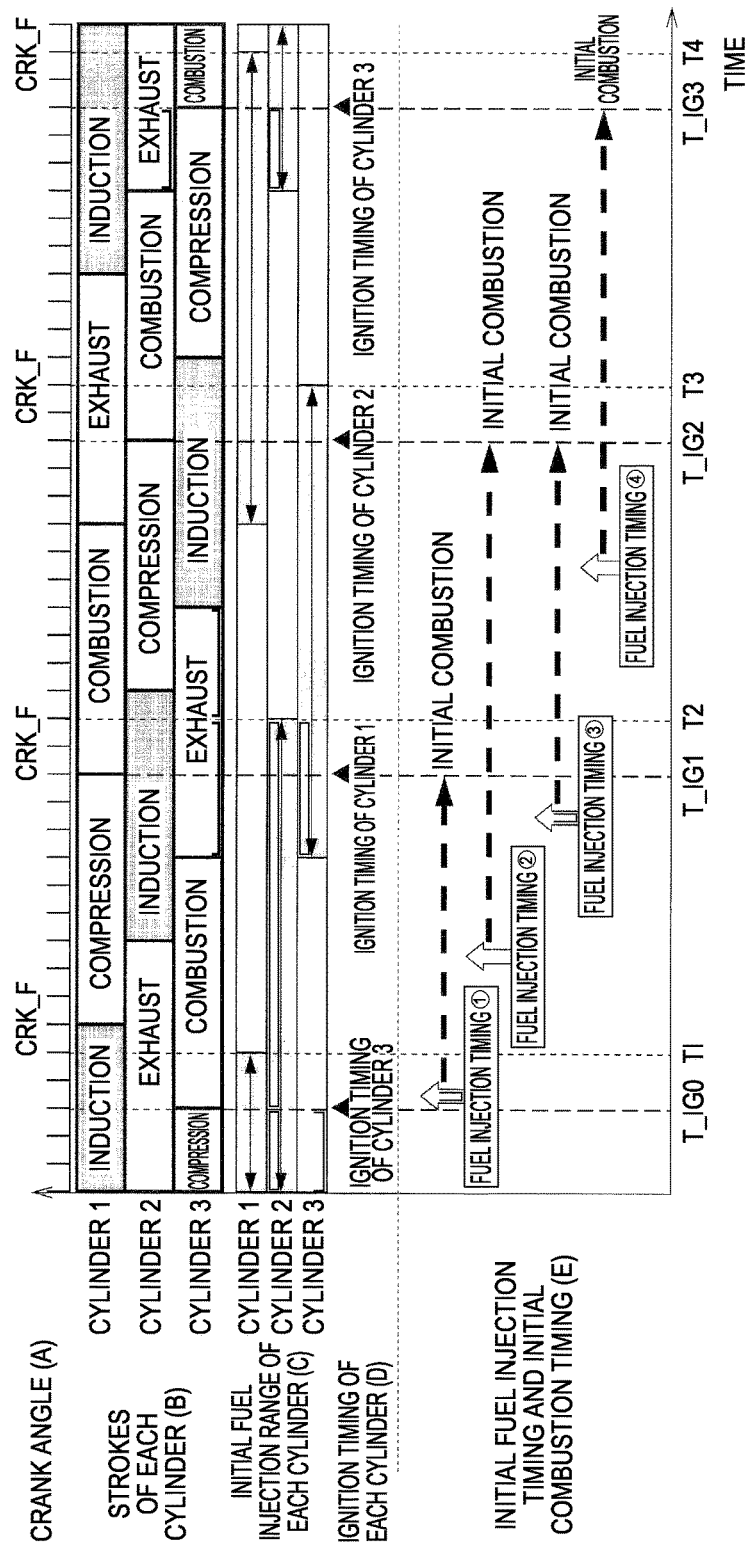
FIG. 3 is a view used to describe fuel injection timing according to the embodiment of the invention.

FIG. 3 is a view showing a relation of strokes, an initial fuel injection range, and initial combustion timing of each cylinder of a cylinder engine. In strokes of each cylinder (B), ignition timing comes when the compression stroke ends. Ignition takes place in the order indicated in the ignition timing of each cylinder (D). Regarding the initial fuel injection to the cylinder, the initial fuel injection is performed to the cylinder according to the initial fuel injection range of each cylinder (C) with reference to the crank angle at the injection timing (A). In the invention, the initial fuel injection timing comes after the self-restoration rotation speed state since the restarting conditions are established is stored (after S110 of FIG. 2 is performed) or after the driving instruction is given to the starting device (starter 15) (after S112 of FIG. 2 is performed). The initial fuel injection range is set to a range from the start of the exhaust stroke of each cylinder to the induction stroke crank angle (CRK_F) which is the limit up to which each cylinder is allowed to suck in fuel.

The injection timing and the combustion timing after the restarting conditions are established will now be described with reference to initial fuel injection timing and initial combustion timing (E) of FIG. 3. In the case of circled 1 indicating injection timing to perform the initial fuel injection until time T1, cylinder 1 and cylinder 2 are in the initial fuel injection range. Hence, initial fuel injection is performed to the cylinder 1 and the cylinder 2. Eventually, the cylinder 1 in the induction stroke shifts to the compression stroke and initial combustion takes place at time T_IG1, which is the ignition timing. In the cases of circled 2 and 3 indicating injection timing between time T1 and time T2, initial fuel injection is performed only to the cylinder 2 at the injection timing indicated by circled 2 and initial fuel injection is performed to the cylinder 2 and cylinder 3 at the injection timing indicated by circled 3. Eventually, the cylinder 2 shifts to the compression stroke and initial combustion takes place at T_IG2, which is the ignition timing. In the case of circled 4 indicating injection timing between time T2 and time T3, initial fuel injection is performed only to the cylinder 3 and initial combustion takes place in the cylinder 3 at time T_IG3 which is the last time in the compression stroke.

After the initial fuel injection is performed, normal fuel injection is performed, more specifically, fuel injection (normal sequential injection) is performed according to the predetermined crank angle of each cylinder in the exhaust stroke. In the invention, the initial fuel injection is performed after the self-restoration rotation speed state NE_SC is stored as described above. Accordingly, initial fuel injection in the self-restorable restarting is in synchronization with a determination that the restarting conditions are established.

Figure 5:
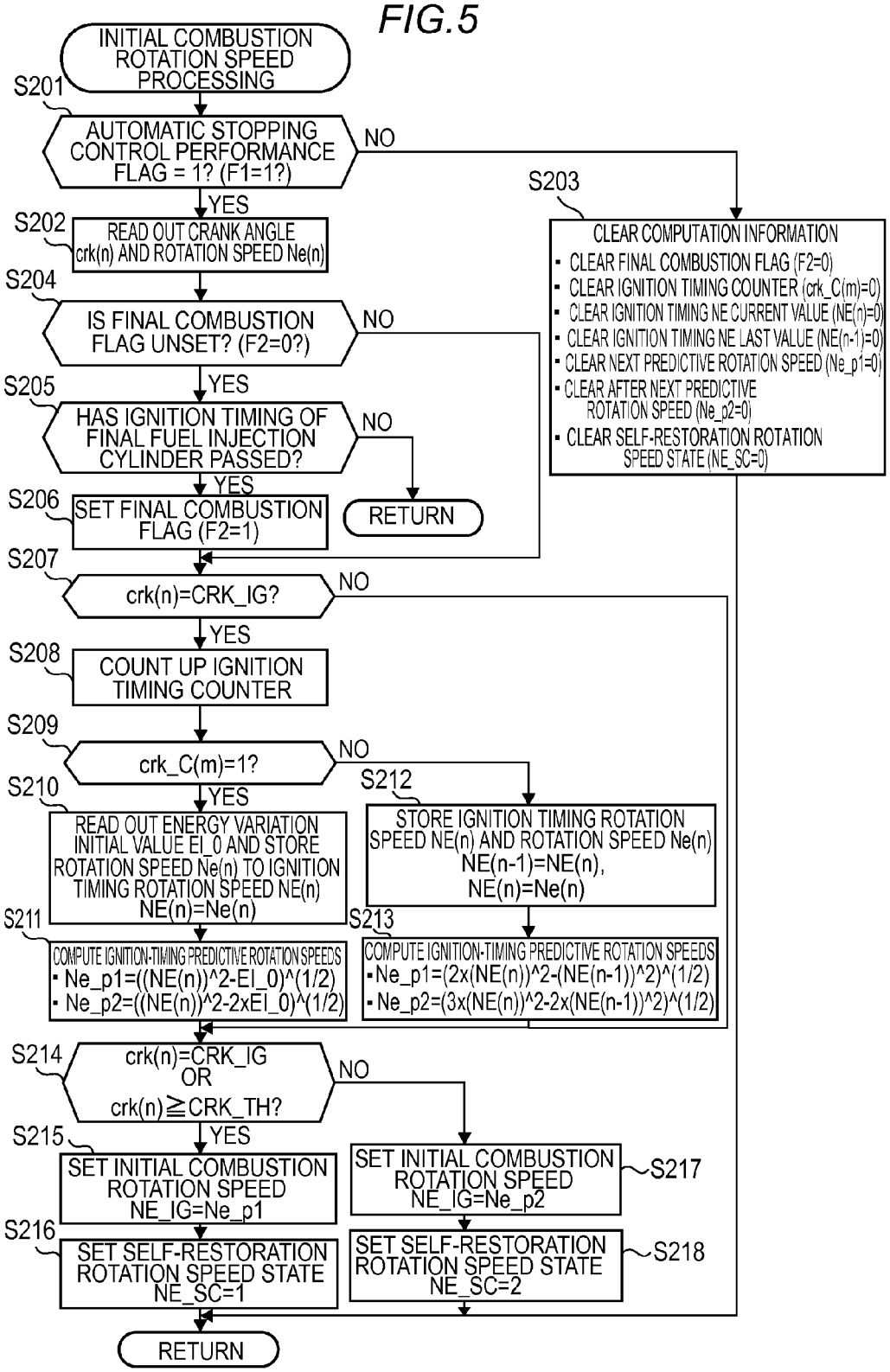
FIG. 5 is a control flowchart of initial combustion rotation speed processing according to the embodiment of the invention.

Referring to FIG. 2 again, when the restarting-time control processing is performed in S113, advancement is made to S114. Here, self-restoration determination rotation speed correction processing is performed next and the automatic stopping and restarting processing is ended. The self-restoration determination rotation speed correction processing performed in S114 is performed in accordance with the flowchart depicted in FIG. 7 and will be described in detail after FIG. 5 is described. The automatic stopping and restarting processing of the engine 1 is performed in the manner as described above.

FIG. 5 will now be described. FIG. 5 is a control flowchart to calculate the initial combustion rotation speed of the invention. According to this control flowchart, a computation is performed each time an output signal from the crank angle sensor 13 is inputted into the ECU 17 and a computation result is read out in S107 of FIG. 2.

When the control flowchart of FIG. 5 is commenced, a determination is made in S201 first as to whether the automatic stopping control performance flag (F1) described with reference to FIG. 2 is set. In a case where the automatic stopping control flag is set (F1=1), a determination of Yes is made and advancement is made to S202. In a case where the automatic stopping control flag is cleared (F1=0 (zero)), a determination of No is made and advancement is made to S203. Here, the processing is ended by clearing various types of computation information, more specifically, by clearing a final combustion flag (F2=0), clearing an ignition timing counter (crk_C(m)=0), clearing an ignition timing NE current value (NE(n)=0), clearing an ignition timing NE last value (NE(n−1)=0), clearing a next predictive rotation speed (Ne_p1=0), clearing an after next predictive rotation speed (Ne_p2=0), and clearing the self-restoration rotation speed state (NE_SC=0).

When advancement is made to S202, the crank angle crk(n) and the rotation speed Ne(n) computed in the other controls are readout and advancement is made to S204. When advancement is made to S204, a determination is made as to whether the final combustion flag (F2) is unset. The final combustion flag (F2) is the flag that is set in S206 described below. In a case where the final combustion flag is cleared (F2=0 (zero)) in S204, a determination of Yes is made and advancement is made to S205. In a case where the final combustion flag is set (F2=1), advancement is made to S207.

When a determination of Yes is made in S204 and advancement is made to S205, a determination is made as to whether ignition timing of the final fuel injection cylinder has passed, in other words, whether combustion of the engine 1 is completed since the automatic stopping conditions are established. This determination is a prerequisite for a predictive rotation speed computation, and the predictive rotation speed is computed after the automatic stopping conditions of the engine 1 are established in a rotation speed range in which the combustion of the engine 1 is ended. In a case where the ignition timing of the final fuel injection cylinder has passed in S205, a determination of Yes is made in S205 and advancement is made to S206. Here, the final combustion flag is set (F2=1) and advancement is made to S207. Meanwhile, in a case where the ignition timing of the final fuel injection cylinder has not passed, a determination of No is made in S205 and the processing is ended by returning the processing to the beginning of the flow.

When advancement is made to S207, a determination is made as to whether the crank angle crk(n) read out in S202 agrees with an ignition timing crank angle CRK_IG (for example, 5 degrees). In a case where the crank angle crk(n) agrees with the ignition timing crank angle CRK_IG, a determination of Yes is made and advancement is made to S208. Here, the ignition timing counter crk_C(m) is counted up only by one and advancement is made to S209. Meanwhile, in a case where the crank angle crk(n) does not agree with the ignition timing crank angle CRK_IG in S207, a determination of No is made and advancement is made to S214.

Figure 6:
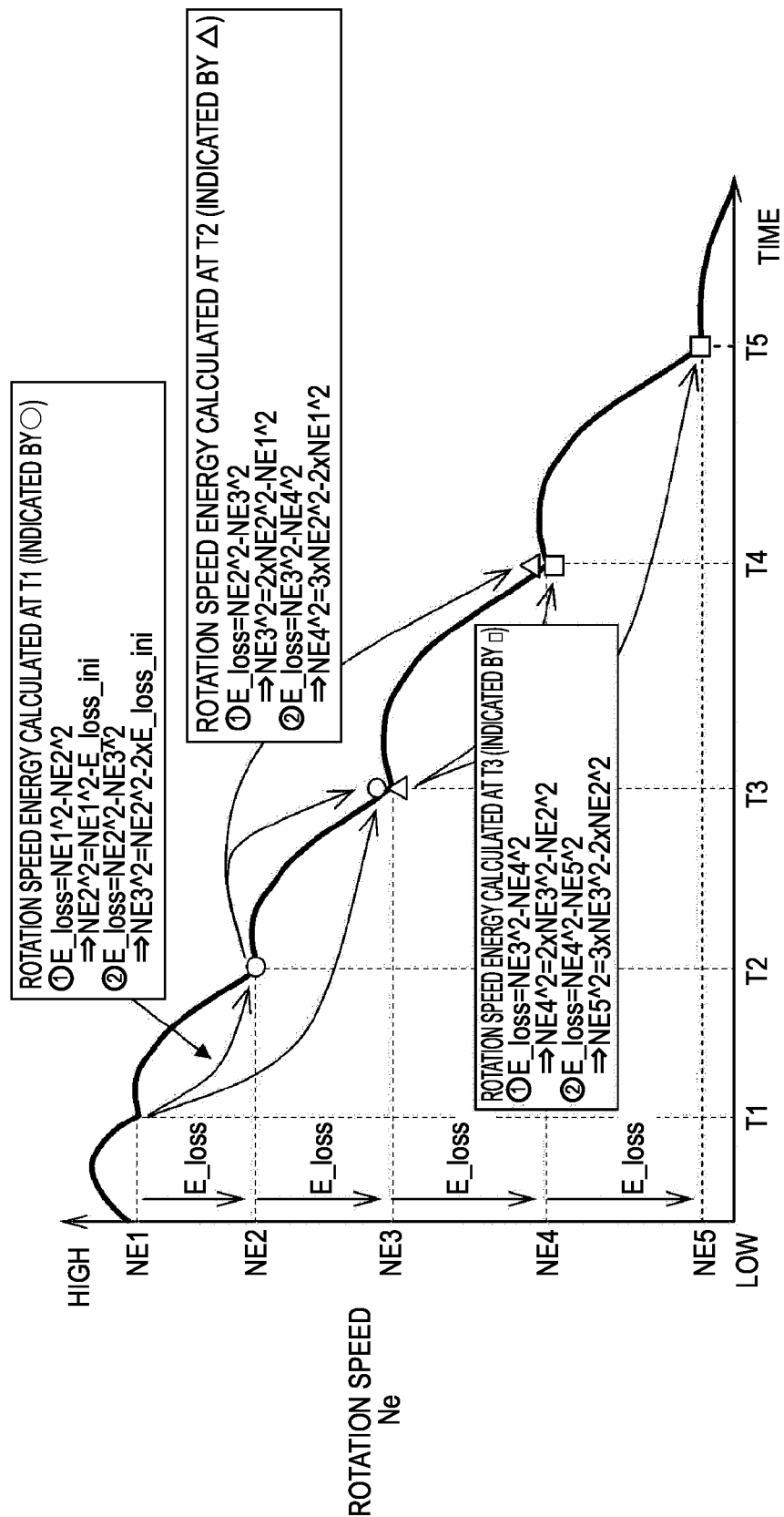
FIG. 6 is a view used to describe a calculation of a predictive rotation speed according to the embodiment of the invention.

The computation of the initial combustion rotation speed NE_IG, that is, the predictive rotation speed is started when a determination of Yes is made in S207. The initial combustion rotation speed NE_IG computed in S208 and subsequent steps will now be described. In the invention, the computation of the initial combustion rotation speed NE_IG is started after the final combustion since the automatic stopping conditions are established. The computation uses a predictive rotation speed that takes a variation of rotation energy of the engine 1 into account. A calculation method of this predictive rotation speed will be described with reference to FIG. 6. FIG. 6 is a view showing calculation values of the predictive rotation speed calculated from the rotation speed Ne and an energy variation of the engine 1 after the automatic stopping conditions are established. In the invention, the predictive rotation speed is calculated at every ignition timing after the final combustion since the automatic stopping conditions are established.

After the final combustion since the automatic stopping conditions are established, the engine 1 loses rotation energy held while the engine 1 was running due to a pumping loss or the like and the rotation speed Ne continues to decrease. It can be assumed that viscous resistance depending on the rotation speed Ne is substantially 0 (zero) during idle rotation at or below an idle rotation speed (for example, 800 r/min). Hence, an energy variation between predetermined crank angles (between ignition timings in the invention) can be thought to be constant independently of the rotation speed Ne. Hence, referring to FIG. 6, let E_loss be an energy variation between the ignition timings and J be the inertia moment of the engine 1, then relations with the rotation speed Ne at the respective ignition timings T1 through T4 are expressed, respectively, by Equations (1) through (4) as follows.

[Equation 1]

Equation 1

$$E\_loss = \frac{1}{2} \times J \times \left(Ne1 \times \frac{2\pi}{60}\right)^2 - \frac{1}{2} \times J \times \left(Ne2 \times \frac{2\pi}{60}\right)^2 \approx (Ne1)^2 - (Ne2)^2 \quad \text{Equation (1)}$$

-continued $$E\_loss = \frac{1}{2} \times J \times \left(Ne2 \times \frac{2\pi}{60}\right)^2 - \frac{1}{2} \times J \times \left(Ne3 \times \frac{2\pi}{60}\right)^2 \approx \quad \text{Equation (2)}$$
$$(Ne2)^2 - (Ne3)^2$$

$$E\_loss = \frac{1}{2} \times J \times \left(Ne3 \times \frac{2\pi}{60}\right)^2 - \frac{1}{2} \times J \times \left(Ne4 \times \frac{2\pi}{60}\right)^2 \approx \quad \text{Equation (3)}$$
$$(Ne3)^2 - (Ne4)^2$$

$$E\_loss = \frac{1}{2} \times J \times \left(Ne4 \times \frac{2\pi}{60}\right)^2 - \frac{1}{2} \times J \times \left(Ne5 \times \frac{2\pi}{60}\right)^2 \approx \quad \text{Equation (4)}$$
$$(Ne4)^2 - (Ne5)^2$$

The rotation speed Ne3 at the third ignition timing and the rotation speed Ne4 at the fourth ignition timing can be calculated by using Equations (1) through (3) above as expressed, respectively, by Equations (5) and (6) as follows.

[Equation 2]
Equation 2

$$(Ne3)^2 = (Ne2)^2 - E\_loss = (Ne2)^2 - ((Ne1)^2 - (Ne2)^2) = 2 \times (Ne2)^2 - (Ne1)^2 \quad \text{Equation (5)}$$

$$(Ne4)^2 = (Ne3)^2 - E\_loss = (2 \times (Ne2)^2 - (Ne1)^2) - ((Ne1)^2 - (Ne2)^2) = 3 \times (Ne2)^2 - 2 \times (Ne1)^2 \quad \text{Equation (6)}$$

Hence, the rotation speeds (Ne3 and Ne4) at the third and fourth ignition timings can be predicted by calculation using the rotation speeds (Ne1 and Ne2) at the ignition timings at time T1 and time T2.

Also, an energy variation E_loss between the crank angles is thought to be constant. Hence, the rotation speeds at the second and third ignition timings can be found from Equations (1) and (2) above using an energy variation initial value E_loss_ini as expressed, respectively, by Equations (7) and (8) below. Hence, the rotation speeds (Ne2 and Ne3) at the second and third ignition timings can be predicted by calculation from the rotation speed Net at the ignition timing at time T1. The energy variation initial value E_loss_ini is a value calculated empirically on the basis of behaviors of the engine 1 after the automatic stopping conditions are established.

[Equation 3]
Equation 3

$$(Ne2)^2 = (Ne1)^2 - E\_loss\_ini \quad \text{Equation (7)}$$

$$(Ne3)^2 = (Ne2)^2 - E\_loss\_ini = (Ne2)^2 - 2 \times E\_loss\_ini \quad \text{Equation (8)}$$

Hence, by detecting the initial ignition timing during idle rotation after the final combustion and using the empirically calculated energy variation initial value E_loss_ini and the rotation speed at the initial ignition timing, the rotation speeds at the next and the after next ignition timings can be predicted by calculation as expressed, respectively, by Equations (9) and (10) below. In a case where the second or subsequent ignition timing is detected, the rotation speeds at the next and after next ignition timings can be predicted by calculation by using the rotation speed at the current ignition timing and the rotation speed at the last ignition timing as expressed, respectively, by Equations (11) and (12) below.

[Equation 4]
Equation 4
When initial ignition timing is detected (when n=1)

$$(Ne(n+1))^2 = (Ne(n))^2 - E\_loss\_ini \quad \text{Equation (9)}$$

$$(Ne(n+2))^2 = (Ne(n))^2 - 2 \times E\_loss\_ini \quad \text{Equation (10)}$$

[Equation 5]
Equation 5
When second or subsequent ignition timing is detected (when n≥2)

$$(Ne(n+1))^2 = 2 \times (Ne(n))^2 - (Ne(n-1))^2 \quad \text{Equation (11)}$$

$$(Ne(n+2))^2 = 3 \times (Ne(n))^2 - 2 \times (Ne(n-1))^2 \quad \text{Equation (12)}$$

The rotation speeds at the ignition timings are predicted by calculation using Equations (9) through (12) above in S209 and subsequent steps of FIG. 5.

Referring to FIG. 5 again to resume the description, in a case where a determination of Yes is made in S207, advancement is made to S208. Here, the ignition timing counter crk_C(m) is counted up only by one and advancement is made to S209. In S209, a determination is made as to whether the ignition timing counter crk_C(m) exhibits 1. In a case where the ignition timing counter crk_C(m) exhibits 1, it means that this is the initial ignition timing after the final combustion. Hence, a determination of Yes is made in S209 and advancement is made to S210. Here, the energy variation initial value EI_0 is read out and the rotation speed Ne(n) at this point is stored into the internal RAM of the ECU 17 as the ignition timing rotation speed NE(n). Subsequently, advancement is made to S211. Here, the next ignition timing predictive rotation speed Ne_p1 (Ne(n+1) in Equation (9) above) and the after next ignition timing predictive rotation speed Ne_p2 (Ne(n+2) in Equation (10) above) are computed respectively using Equations (9) and (10) above. Subsequently, advancement is made to S214. It should be noted that the energy variation initial value EI_0 is preliminarily stored in the internal ROM of the ECU 17.

Meanwhile, in a case where the ignition timing counter crk_C(m) exhibits a value larger than 1 in S209, it means that this is the second or subsequent ignition timing. Hence, a determination of No is made and advancement is made to S212. Here, the ignition timing rotation speed NE(n) and the rotation speed Ne(n) are stored. More specifically, the ignition timing rotation speed NE(n) is stored as the last value NE(n−1) of the ignition timing rotation speed and the rotation speed Ne(n) is stored as the ignition timing rotation speed NE(n). Subsequently, advancement is made to S213. Here, the next ignition timing predictive rotation speed Ne_p1 (Ne(n+1) in Equation (11) above) and the after next ignition timing predictive rotation speed Ne_p2 (Ne(n+2) in Equation (12) above) are computed respectively using Equations (11) and (12) above. Subsequently, advancement is made to S214.

When advancement is made to S214, a determination is made regarding the crank angle crk(n). More specifically, a determination is made as to whether the crank angle crk(n) agrees with the ignition timing crank angle CRK_IG or whether the crank angle crk(n) is equal to or larger than a fuel injection crank angle determination value CRK_TH. The fuel injection crank angle determination value CRK_TH is set according to the induction stroke crank angle CRK_F which is the limit up to which each cylinder is allowed to suck in fuel as described above with reference to FIG. 3, and set, for example, to 215 degrees. In a case where the crank angle crk(n) agrees with the ignition timing crank angle CRK_IG or is equal to or larger than the ignition timing fuel injection crank angle determination value CRK_TH in S214, a determination of Yes is made and advancement is made to S215. In a case where the crank angle crk(n) is smaller than the fuel injection crank angle determination value CRK_TH, advancement is made to S217.

A determination in S214 will now be described. As has been described with reference to FIG. 6, the predictive rotation speed is computed at every ignition timing to find the rotation speeds at the next and after next ignition timings. Also, as is shown in FIG. 3 (initial fuel injection range of each cylinder (C) of FIG. 3), the initial fuel injection is set over the ignition timings of the cylinder. Hence, combustion takes place at the initial ignition after the fuel injection depending on the crank angle crk(n) at the fuel injection timing. In other words, when fuel is injected before the fuel injection crank angle determination value CRK_TH is achieved, initial combustion takes place at the next ignition timing (next predictive rotation speed). Hence, a determination in S214 is made on the ground as follows. That is, in a case where the crank angle crk(n) is equal to or larger than the fuel injection crank angle determination value CRK_TH in S214 (a determination in S214 is Yes), the initial combustion rotation speed NE_IG is found to be the next predictive rotation speed Ne_p1 whereas in a case where the crank angle crk(n) is smaller than the fuel injection crank angle determination value CRK_TH (a determination in S214 is No), the initial combustion rotation speed NE_IG is found to be the after next predictive rotation speed Ne_p2.

In a case where a determination of Yes is made in S214 and advancement is made to S215, the next predictive rotation speed Ne_p1 is set to the initial combustion rotation speed NE_IG. Subsequently, advancement is made to S216. Here, the self-restoration rotation speed state NE_SC is set to 1 and the processing is returned to the beginning of the flow. In a case where a determination of No is made in S214, advancement is made to S217. Here, the after next predictive rotation speed Ne_p2 is set to the initial combustion rotation speed NE_IG. Subsequently, advancement is made to S218. Here, the self-restoration rotation speed state NE_SC is set to 2 and the processing is returned to the beginning of the flow. As has been described, the initial combustion rotation speed NE_IG is determined in accordance with the control flowchart depicted in FIG. 5.

Figure 7:
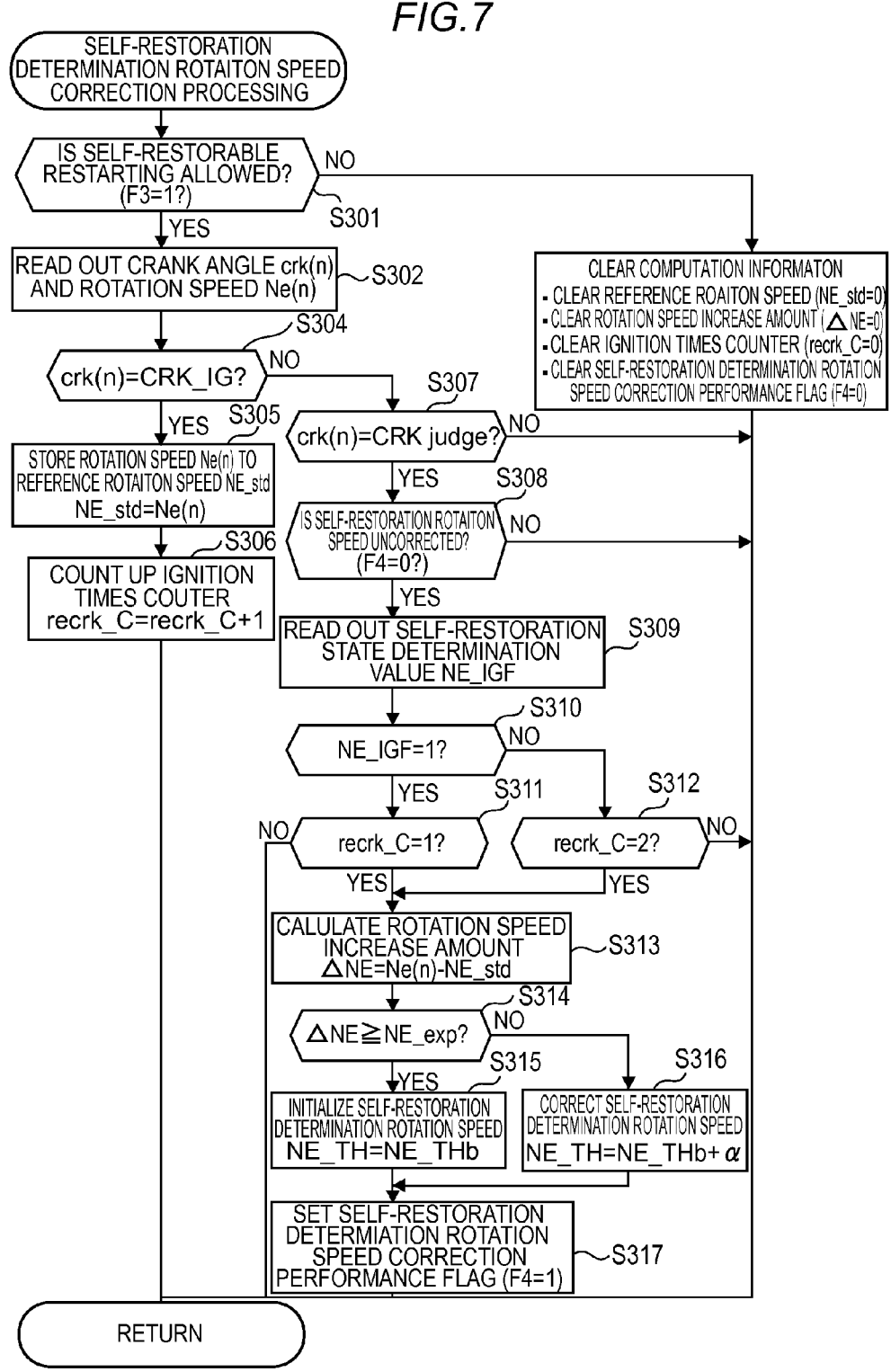
FIG. 7 is a control flowchart of self-restoration determination rotation speed correction processing according to the embodiment of the invention.

FIG. 7 will now be described. FIG. 7 is the control flowchart of the self-restoration determination rotation speed correction processing performed in S114 of FIG. 2 and a computation is performed each time an output signal of the crank angle sensor 13 is inputted into the ECU 17.

When the self-restoration determination rotation speed correction processing is commenced, a determination is made in S301 first as to whether the self-restorable restarting is allowed. The determination regarding the self-restorable restarting is made with reference to the self-restorable restarting flag (F3) that is set in S109 of FIG. 2. In a case where the self-restorable restarting flag is set (F3=1), a determination of Yes is made in S301 and advancement is made to S302. In a case where the self-restorable restarting flag is cleared (F3=0 (zero)), a determination of No is made and advancement is made to S303. Here, the processing is ended by clearing various types of computation information, more specifically, by clearing a reference rotation speed (NE_std=0), clearing a rotation speed increase amount (ΔNE=0), clearing an ignition times counter (recrk_C=0), clearing the self-restoration determination rotation speed correction performance flag (F4=0), and so on. By making the determination of S301, the self-restoration determination rotation speed correction processing described below is performed only when the engine 1 is restarted by self-restoration.

When advancement is made to S302, the crank angle crk(n) and the rotation speed Ne(n) are read out and advancement is made to S304. When advancement is made to S304, a determination is made as to whether the crank angle crk(n) read out in S302 agrees with the ignition timing crank angle CRK_IG. In a case where the crank angle crk(n) agrees with the ignition timing crank angle CRK_IG, a determination of Yes is made in S304 and advancement is made to S305. When advancement is made to S305, the rotation speed Ne(n) read out in S302 is stored in the internal RAM of the ECU 17 as the reference rotation speed NE_std and advancement is made to S306. In S306, the ignition times counter recrk_C is counted up only by one and the processing is returned to the beginning of the flow.

Meanwhile, in a case where the crank angle crk(n) does not agree with the ignition timing crank angle CRK_IG in S304, a determination of No is made and advancement is made to S307. In S307, a determination is made next as to whether the crank angle crk(n) agrees with a combustion determination crank angle CRK_judge (for example, 125 degrees). In a case where the crank angle crk(n) agrees with the combustion determination crank angle CRK_judge, a determination of Yes is made and advancement is made to S308. In a case where the crank angle crk(n) does not agree with the combustion determination crank angle CRK_judge, a determination of No is made and the processing is returned to the beginning of the flow.

A reason why the computation in S307 is performed will now be described. The rotation speed Ne(n) of the engine 1 is not increased as soon as the ignition timing CRK_IG comes. Because the rotation speed Ne(n) increases due to combustion energy generated by combustion in each cylinder, the maximal value of an increase of the rotation speed has a latency from the ignition timing CRK_IG and the latency varies with the rotation speed at the ignition timing CRK_IG. Hence, the combustion determination crank angle CRK_judge is set so that an increase amount of the rotation speed is determined by using a rotation speed at a particular crank angle.

When advancement is made to S308, a determination is made next as to whether the self-restoration determination rotation speed correction is unperformed. Information used in S308 is the self-restoration determination rotation speed correction performance flag (F4) which is the flag set in S317 described below. At the initial computation in S308, the self-restoration determination rotation speed is not corrected. Hence, a determination of Yes is made and advancement is made to S309. At the second computation, because the self-restoration determination rotation speed is corrected, a determination of No is made and the processing is ended by returning the processing to the beginning of the flow.

When advancement is made to S309, the self-restoration state determination value NE_IGF that is set in S110 of FIG. 2 is read out and advancement is made to S310. Here, a determination is made regarding the self-restoration state determination value NE_IGF. In a case where the self-restoration state determination value NE_IGF is 1, a determination of Yes is made and advancement is made to S311. Otherwise, a determination of No is made and advancement is made to S312. As has been described above with reference to FIG. 5, the determination in S310 is the determination made because the initial combustion takes place at the next or the after next ignition timing. The determination in S310 is made on the ground that combustion takes place at the initial ignition by the self-restorable starting when the self-restoration state determination value NE_IGF is 1 whereas initial combustion takes place from the second ignition when the self-restoration state determination value NE_IGF is 2.

When advancement is made to S311 because a determination of Yes is made in S310, a determination regarding the ignition times counter recrk_C is made next. In a case where the ignition times counter recrk_C exhibits 1, a determination of Yes is made and advancement is made to S313. Otherwise, a determination of No is made and the processing is returned to the beginning of the flow. In a case where a determination of No is made in S310, advancement is made to S312. Here, a determination is made regarding the ignition times counter recrk_C. In a case where the ignition times counter recrk_C exhibits 2, a determination of Yes is made and advancement is made to S313. In a case where a determination of No is made in S312, the processing is ended by returning the processing to the beginning of the flow.

Figure 8:
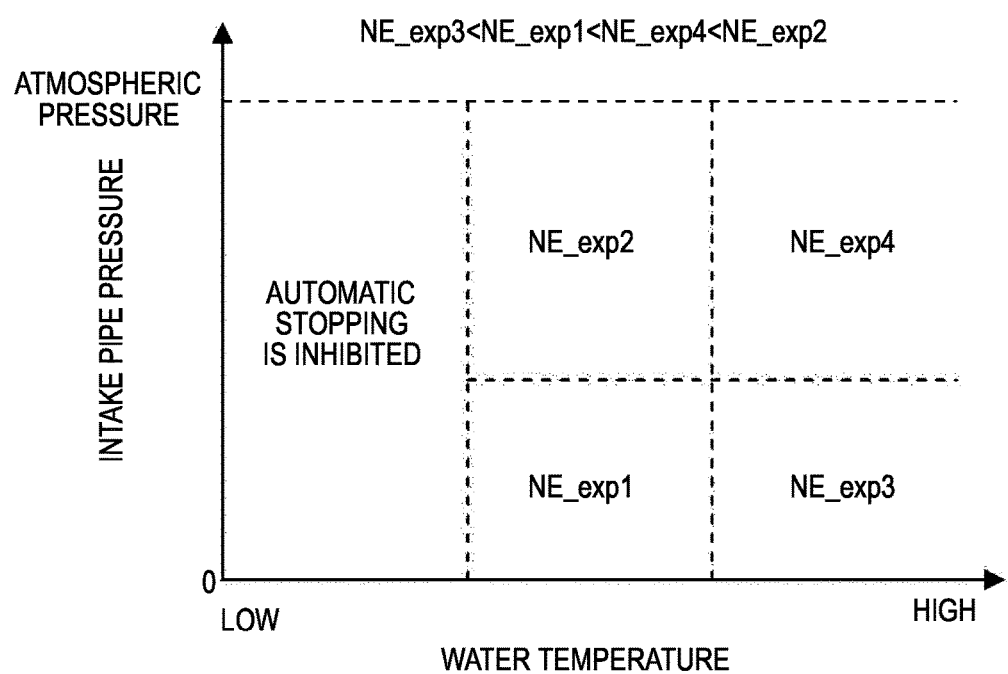
FIG. 8 is a view showing a setting example of a self-restoration determination rotation speed correction necessity determination value according to the embodiment of the invention.

When advancement is made to S313, a rotation speed increase amount $\Delta NE$ is calculated from the rotation speed Ne(n) read out in S302 and the reference rotation speed NE_std stored in S305. Subsequently, advancement is made to S314. When advancement is made to S314, the rotation speed increase amount $\Delta NE$ calculated in S313 is compared with a self-restoration determination rotation speed correction necessity determination value (i.e. determination value used to determine a necessity of a correction on the self-restoration determination rotation speed) NE_exp. S314 is a step where a computation is performed so as to determine combustion characteristics of the initial combustion and the self-restoration determination rotation speed correction necessity determination value NE_exp is set, for example, to 150 r/min. Alternatively, the self-restoration determination rotation speed correction necessity determination value NE_exp may be calculated from a map as shown in FIG. 8 according to states of the engine 1, such as a water temperature, an intake pipe pressure, and a rotation load of the engine 1 when the restarting conditions are established. More specifically, referring to FIG. 8, the abscissa is used for the water temperature of the engine 1. A variation of the rotation speed Ne increases more as the water temperature of the engine 1 becomes lower, and by taking this into account, the set value is set to a higher value as the water temperature becomes lower and also the set value is set higher as the intake pipe pressure becomes higher.

Figure 9:
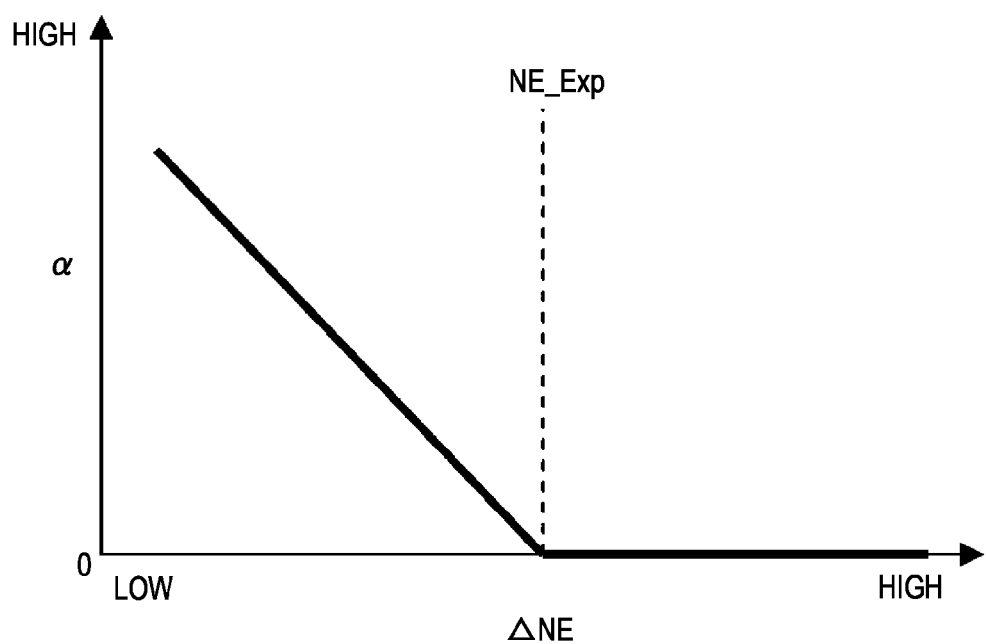
FIG. 9 is a view showing a setting example of a predetermined value added to a self-restoration determination rotation speed according to the embodiment of the invention.

In a case where the rotation speed increase amount $\Delta NE$ is equal to or larger than the self-restoration determination rotation speed correction necessity determination value NE_exp in S314, a determination of Yes is made and advancement is made to S315. In S315, the self-restoration determination rotation speed NE_TH is initialized (a reference value NE_THb is substituted for the self-restoration determination rotation speed NE_TH) and advancement is made to S317. Here, the performance flag of the self-restoration determination rotation speed correction is set (F4=1) and the processing is returned to the beginning of the flow. It should be noted that the reference value NE_THb is preliminarily stored in the internal ROM of the ECU 17. Meanwhile, in a case where a determination of No is made in S314, it means that initial combustion characteristics are determined as being poor. Hence, advancement is made to S316. Here, only a predetermined value $\alpha$ is added to the self-restoration determination rotation speed NE_TH (a sum of the reference value NE_THb and the predetermined value $\alpha$ is substituted for the self-restoration determination rotation speed NE_TH). Subsequently, advancement is made to S317. Here, the performance flag of the self-restoration determination rotation speed correction is set (F4=1) and the processing is returned to the beginning of the flow. The predetermined value $\alpha$ is set from the map as shown in FIG. 9. As has been described, the self-restoration determination rotation speed correction processing is performed in accordance with the control flowchart depicted in FIG. 7.

Timing charts of FIG. 10 and FIG. 11 will now be described. These drawings are timing charts indicating an operation of the self-restoration determination of the invention in behaviors of the engine 1 while the rotation speed Ne is decreasing after the automatic stopping conditions are established. In the drawings, the abscissa is used for the time and the ordinate is used for the rotation speed Ne(A), the crank angle crk(B), the ignition timing counter crk_C, the ignition times counter recrk_C (C), strokes of each cylinder (D), the initial combustion rotation speed NE_IG (E), the self-restoration rotation speed state NE_SC (F), the rotation speed increase amount $\Delta NE(G)$, the automatic stopping control performance flag F1 (H), the final combustion flag F2 (I), the self-restorable restarting flag F3 (J), and the self-restoration determination rotation speed correction performance flag F4 (K).

Figure 10:
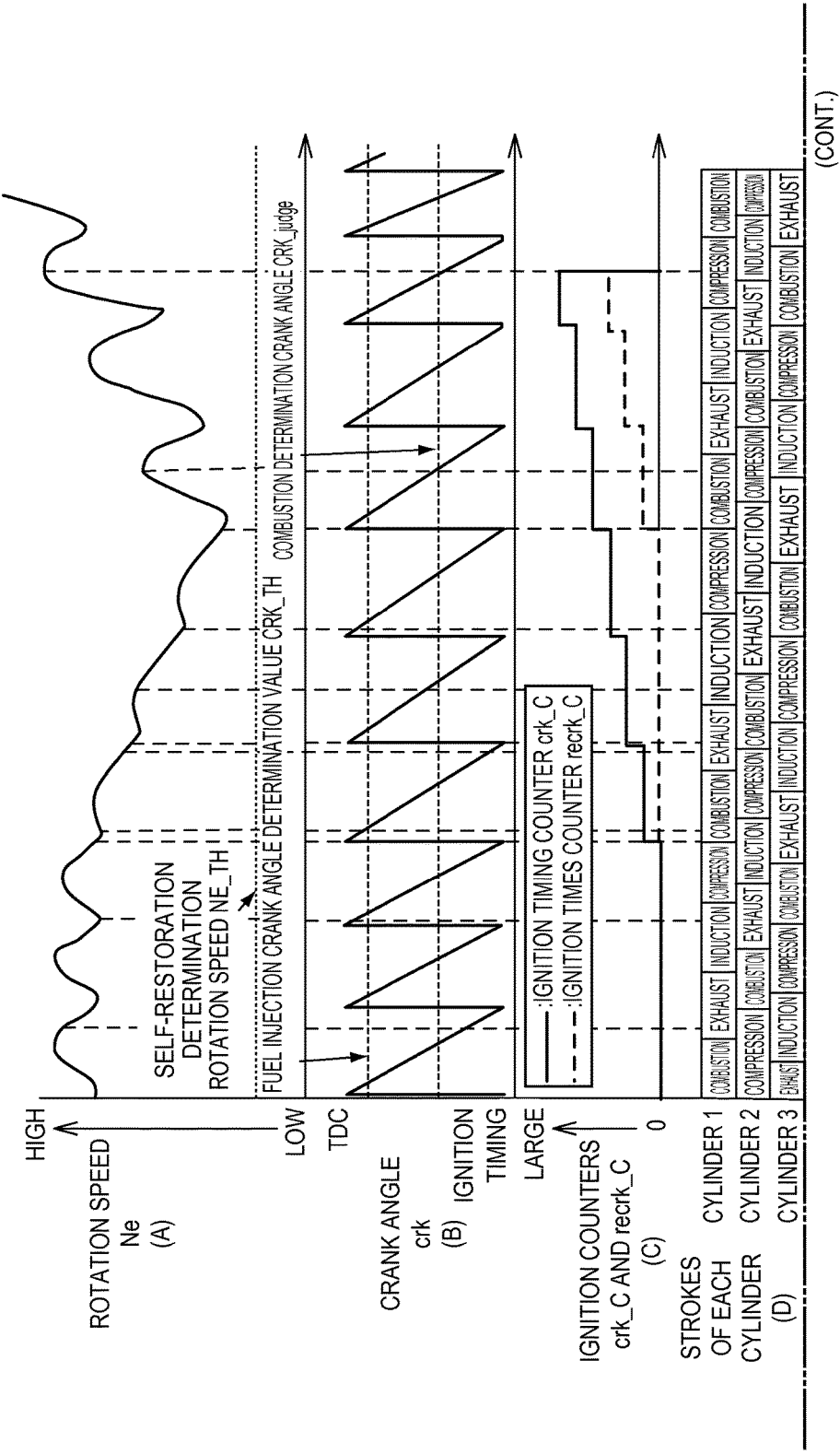
FIG. 10 is a timing chart showing an example of self-restorable restarting according to the embodiment of the invention.
Figure 10:
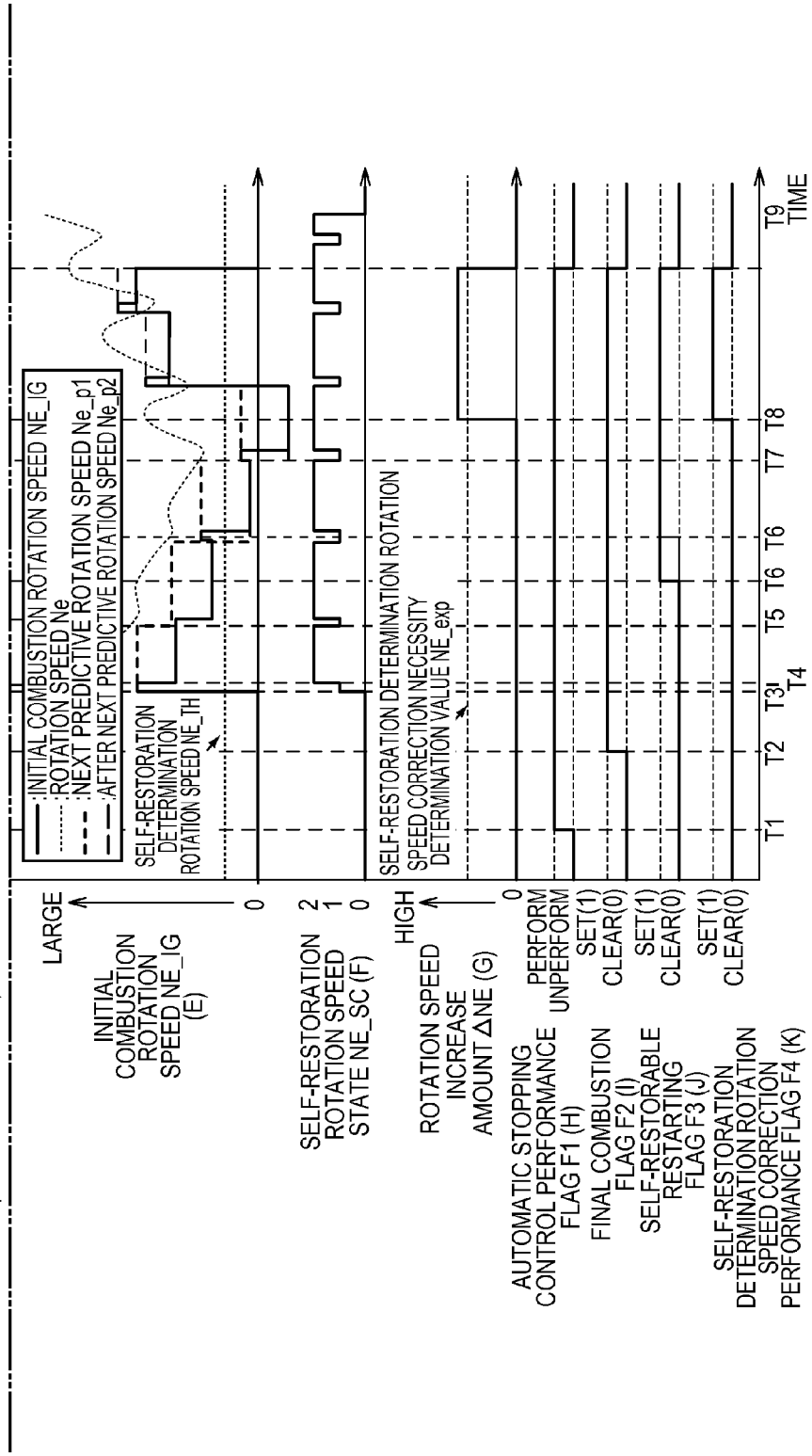

FIG. 10 will be described first. Referring to FIG. 10, when the automatic stopping conditions are established at time T1 and the automatic stopping is performed, the automatic stopping performance flag F1 (H) is set (F1=1) because the automatic stopping control, such as stopping the fuel injection from the fuel injection values 12, is performed. Subsequently, the final combustion flag F2 (I) is set (F2=1) at time T2 that is when combustion of the fuel injected before the automatic stopping conditions are established takes place. Hence, the initial combustion rotation speed NE_IG (E) can be computed each time the ignition timing is detected at and after time T2.

When the time elapsed to time T3, the initial ignition timing after the final combustion is detected. Hence, the ignition timing counter crk_C (C) is counted up only by one and the initial combustion rotation speed NE_IG (E) is computed. As has been described with reference to FIG. 5, the initial combustion rotation speed NE_IG (E) is computed by calculating the next predictive rotation speed Ne_p1 and the after next predictive rotation speed Ne_p2 using the rotation speed Ne (A) at time T3 and the energy variation initial value EI_0. Subsequently, the initial combustion rotation speed NE_IG (E) is set according to the crank angle crk(B) at time T3. Because the crank angle crk(B) agrees with the ignition timing crank angle CRK_IG at time T3, the next predictive rotation speed Ne_p1 is set to the initial combustion rotation speed NE_IG (E) (S215 of FIG. 5). Also, the self-restoration rotation speed state NE_SC (F) is set to 1.

At time T4, the crank angle crk(B) becomes smaller than the fuel injection crank angle determination value CRK_TH. Hence, the initial combustion rotation speed NE_IG (E) is updated to the after next predictive rotation speed Ne_p2 (S217 of FIG. 5). Also, the self-restoration rotation speed state NE_SC (F) is set to 2 and none of the computation values are updated until the next ignition timing is detected.

When the second ignition timing after the final combustion is detected next at time T5, the ignition timing counter crk_C (C) is counted up only by one and exhibits 2. Also, the initial combustion rotation speed NE_IG (E) is computed again. Because the initial ignition timing is detected at time T3, as has been described with reference to FIG. 5, the next predictive rotation speed Ne_p1 and the after next predictive rotation speed Ne_p2 are calculated at time T5 using the rotation speeds Ne at time T3 and time T5. Because the crank angle crk(B) agrees with the ignition timing crank angle CRK_IG, the initial combustion rotation speed NE_IG is updated to the computed next predictive rotation speed Ne_p1. When the crank angle crk(B) becomes smaller than the fuel injection crank angle determination value CRK_TH at and after time T5, the initial combustion rotation speed NE_IG is updated to the after next predictive rotation speed Ne_p2.

In this manner, in a case where the ignition timing is detected again at and after time T5, the next predictive rotation speed Ne_p1 and the after next predictive rotation speed Ne_p2 are computed using the rotation speed at the detection and the rotation speed at the last ignition timing, so that the initial combustion rotation speed NE_IG (E) is updated according to the crank angle crk(B).

In a case where the restarting conditions are established at time T6, because the initial combustion rotation speed NE_IG (E) is as high as or higher than the self-restoration determination rotation speed NE_TH, the self-restorable restarting is performed and the self-restorable restarting flag F3 (J) is set (F3=1). The initial fuel injection at time T6 is the fuel injection to the cylinder 1 and the initial combustion rotation speed NE_IG is found to be the after next predictive rotation speed Ne_p2. Also, the self-restoration rotation speed state NE_SC is stored as the self-restoration state determination value NE_IGF at time T6.

In a case where the restarting conditions are established at time T6', because the initial combustion rotation speed NE_IG (E) is as high as or higher than the self-restoration determination rotation speed NE_TH, the self-restorable restarting is performed and the self-restorable restarting flag F3 (J) is set (F3=1), too. In the case of time T6', the self-restorable restarting is performed as in the case of time T6. However, the restarting conditions are established after the detection of the third ignition timing after the final combustion and the crank angle crk(B) is as high as or higher than the fuel injection crank angle determination value CRK_TH. Accordingly, the results of the self-restoration determination computation are different and the initial combustion rotation speed NE_IG is found to be the next predictive rotation speed Ne_p1. Also, the initial fuel injection is the fuel injection to the cylinder 1 and the cylinder 2. Further, the self-restoration rotation speed state NE_SC is stored as the self-restoration state determination value NE_IGF at time T6'.

The restarting conditions are established at time T6 (or time T6') and the initial combustion of the fuel injected into the corresponding cylinder takes place at time T7 so that the rotation speed Ne(A) starts increasing. Also, the ignition times counter recrk_C (C) is counted up only by one. The rotation speed increase amount ΔNE(G) is computed when the crank angle crk(B) agrees with the combustion determination crank angle CRK_judge at time T8. In FIG. 10, because the rotation speed increase amount ΔNE is equal to or larger than the self-restoration determination rotation speed correction necessity determination value NE_exp, the self-restoration determination rotation speed NE_TH is updated to the self-restoration determination rotation speed initial value NE_THb. Also, the self-restoration determination rotation speed correction performance flag F4 (K) is set (F4=1).

Accordingly, successively injected fuel burns and the rotation speed Ne(A) increases. The self-restorable restarting is completed at time T9. Hence, the ignition timing counter crk_C, the ignition times counter recrk_C, the initial combustion rotation speed NE_IG, the next predictive rotation speed Ne_p1, the after next predictive rotation speed Ne_p2, the self-restoration determination rotation speed state NE_SC, the rotation speed increase amount ΔNE, and various flags (F1 through F4) are cleared.

Figure 11:
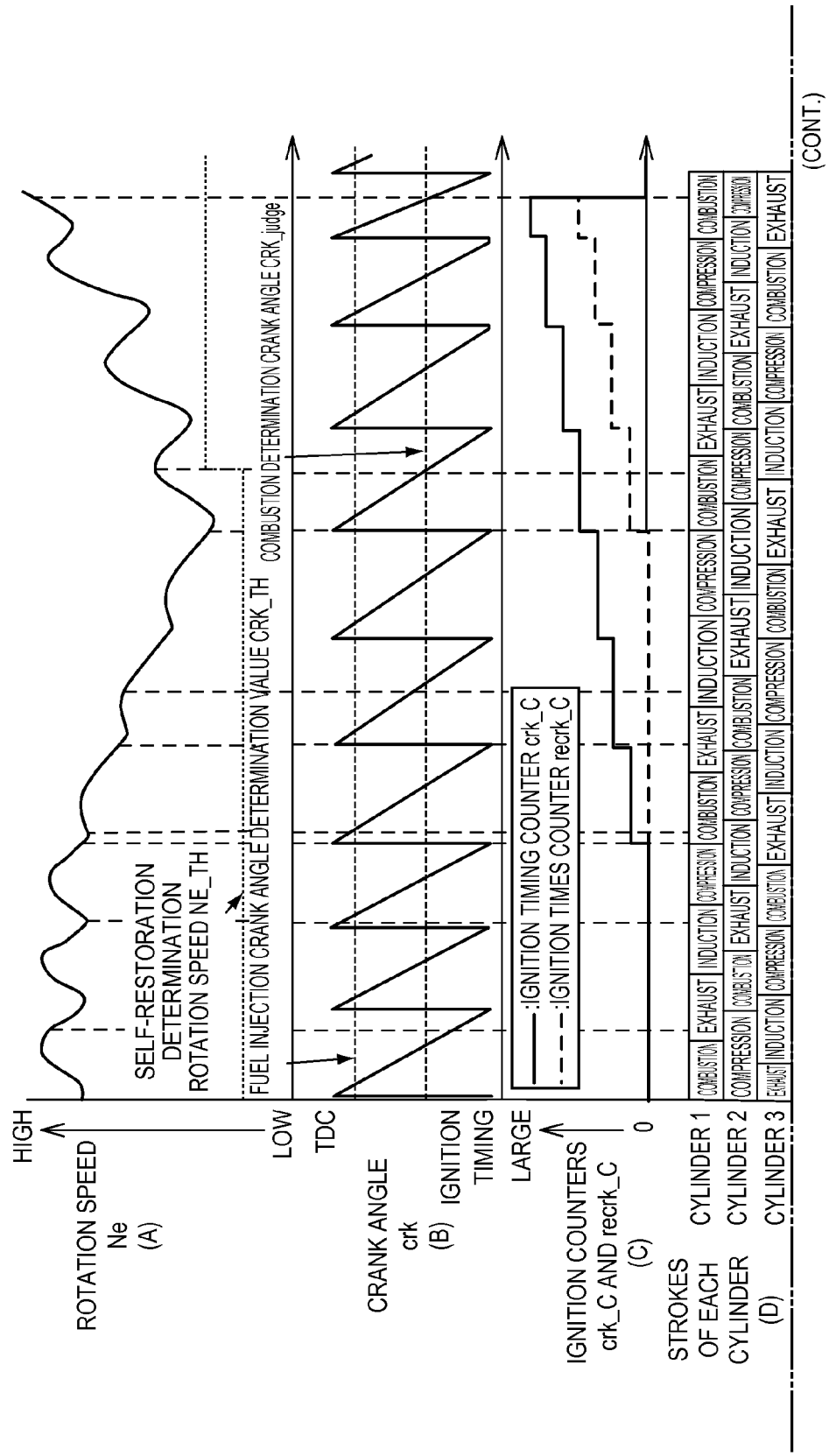
FIG. 11 is a timing chart showing another example of the self-restorable restarting according to the embodiment of the invention.
Figure 11:
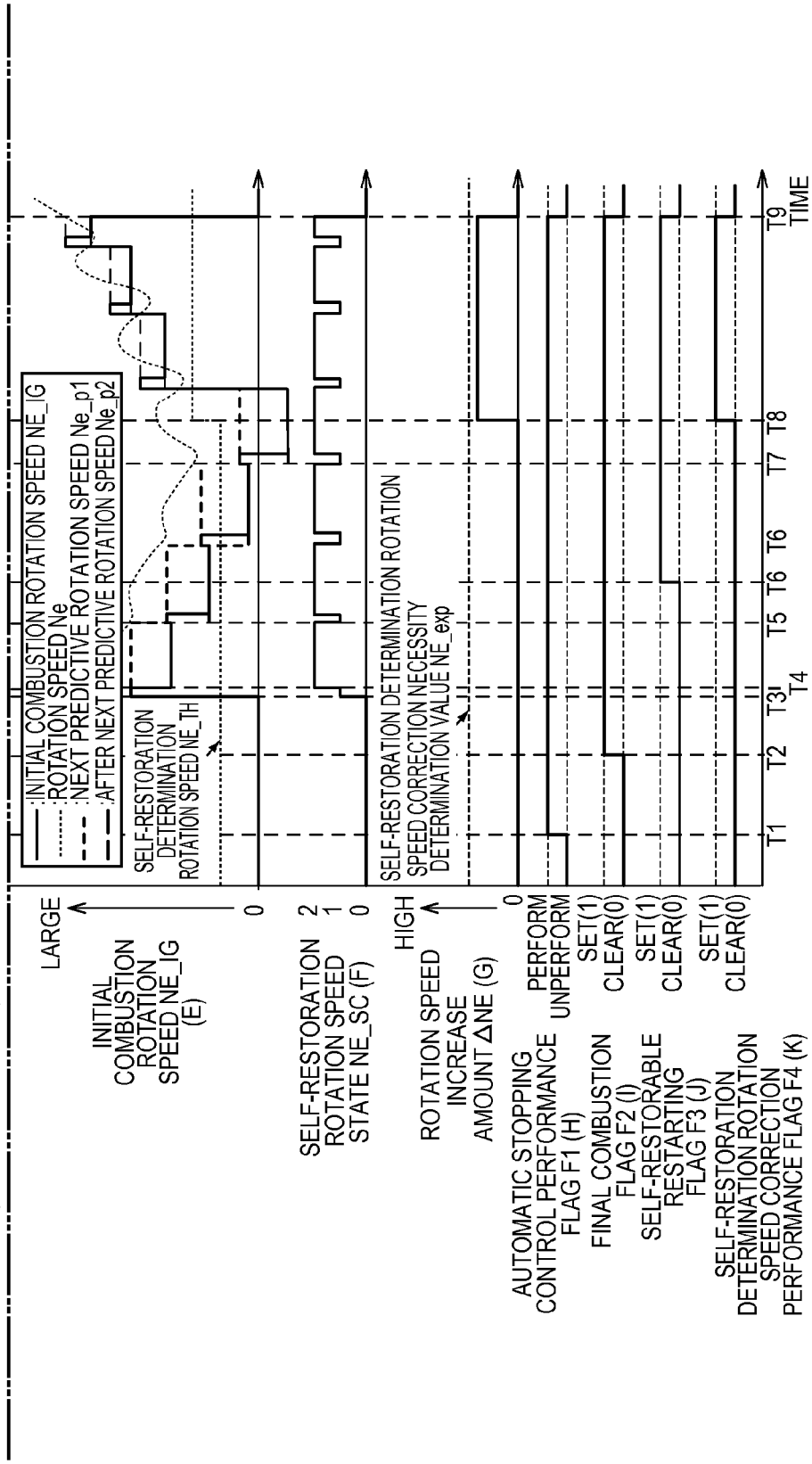

FIG. 11 will now be described. FIG. 11 shows a case where the initial combustion by the self-restorable restarting is poor. Because the contents are the same as the contents of FIG. 10 except that the self-restoration determination rotation speed NE_TH is updated, the description other than the changed portion is simplified.

Firstly, when the automatic stopping conditions are established at time T1 and the automatic stopping control is performed, the automatic stopping control performance flag F1 (H) is set (F1=1). Because the final combustion since the automatic stopping conditions are established takes place at time T2, the final combustion flag F2(I) is set (F2=1) and the initial combustion rotation speed NE_IG (E) is computed from the time (time T3) of the ignition timing detected next.

The initial combustion timing after the final combustion comes at time T3. Hence, the ignition timing counter crk_C (C) is counted up only by one and the initial combustion rotation speed NE_IG (E) is computed by calculating the next predictive rotation speed Ne_p1 and the after next predictive rotation speed Ne_p2 as described above. At time T3, the initial combustion rotation speed NE_IG (E) changes to the next predictive rotation speed Ne_p1 due to the crank angle crk(B). Because the crank angle crk(B) becomes smaller than the fuel injection crank angle determination value CRK_TH at time T4, the initial combustion rotation speed NE_IG (E) is updated to the after next predictive rotation speed Ne_p2.

At time T5, the second ignition timing after the final combustion is detected. Hence, the ignition timing counter crk_C (C) is counted up further only by one. Accordingly, the initial combustion rotation speed NE_IG (E) is computed by calculating the next predictive rotation speed Ne_p1 and the after next predictive rotation speed Ne_p2 using the rotation speeds Ne at time T3 and time T5. The initial combustion rotation speed NE_IG (E) changes to the next predictive rotation speed Ne_p1 at time T5.

When the restarting conditions are established at time T6, because the initial combustion rotation speed NE_IG (E) is as high as or higher than the self-restoration lower limit rotation speed NE_TH, the self-restorable restarting flag F3 is set (F3=1). Also, the initial fuel injection is performed (fuel is injected into the cylinder 1 in FIG. 11) according to the crank angle crk(B) at this point. Also, the initial combustion rotation speed NE_IG is set to the after next predictive rotation speed Ne_p2 at time T6. Further, the self-restoration rotation speed state NE_SC is stored as the self-restoration state determination value NE_IGF at time T6.

At time T7 after the restarting conditions are established, fuel injected by the initial injection at time T6 burns, so that the rotation speed Ne(A) starts increasing. Accordingly, the ignition times counter recrk_C (C) is counted up only by one. The rotation speed increase amount ΔNE(G) is calculated at time T8 when the crank angle crk(B) agrees with the fuel determination crank angle CRK_judge. In FIG. 11, the rotation speed increase amount ΔNE(G) is equal to or less than the self-restoration determination rotation speed correction necessity determination value NE_exp, that is, an increase in rotation by the initial combustion is deteriorating, only the predetermined value (α) is added to the self-restoration determination rotation speed NE_TH (see (A) or (E) of FIG. 11). Also, the self-restoration determination rotation speed correction performance flag F4 (K) is set (F4=1).

When the self-restorable restarting is completed at time T9, the ignition timing counter crk_C, the ignition times counter recrk_C, the initial combustion rotation speed NE_IG, the next predictive rotation speed Ne_p1, the after next predictive rotation speed Ne_p2, the self-restoration determination rotation speed state NE_SC, the rotation speed increase amount ΔNE, and the various flags (F1 through F4) are cleared.

As has been described, according to the embodiment of the invention, the rotation speed at the ignition timing is predicted at every ignition timing after the final combustion since the internal combustion engine is automatically stopped. Hence, the rotation speed at the initial combustion by the self-restorable restarting can be understood precisely. Also, a determination is made as to whether the self-restorable restarting is allowed by comparing the predictive rotation speed with the self-restoration determination rotation speed. Hence, the self-restorable restarting can be performed in a reliable manner. Because the self-restorable restarting can be performed in a reliable manner, it is not necessary to drive the starting device (starter 15) because of a failure of the self-restorable restarting. Hence, the starting device (starter 15) is not driven more frequently than is necessary.

The self-restoration determination rotation speed is set according to the running state of the internal combustion engine. Hence, the determination accuracy of the self-restorable restarting can be improved.

In a case where the combustion characteristics of the initial combustion are poor even when the self-restorable restarting is performed, a determination is made as to whether the next self-restorable restarting is allowed by increasing the self-restoration determination rotation speed. Hence, it becomes possible to avoid a failure of the self-restorable restarting due to aging deterioration of the internal combustion engine.

Also, the self-restoration determination rotation speed correction is performed by the setting corresponding to the running state of the internal combustion engine. Hence, the determination accuracy of the self-restorable restarting can be improved.

The embodiment of the invention has been described using the port-injected internal combustion engine. It should be appreciated, however, that the invention is not limited to this type of internal combustion engine and the invention is also applicable to a cylinder injection internal combustion engine. Also, the number of the cylinders of the internal combustion engine is not limited to three and the invention is also applicable to a four-cylinder or six-cylinder internal combustion engine.

In the embodiment of the invention, a predetermined value is added to the self-restoration determination rotation speed when the rotation speed increase amount ΔNE is smaller than the self-restoration determination rotation speed correction necessity determination value NE_exp. However, the predetermined value may be calculated according to a difference between the predictive rotation speeds, that is, a rotation speed difference between the next predictive rotation speed Ne_p1 and the after next predictive rotation speed Ne_p2 may be calculated to correct the self-restoration determination rotation speed.

REFERENCE SIGNS LIST

1: internal combustion engine (engine)
2: air filter
3: intake temperature sensor
4: airflow sensor
5: motor
6: throttle valve
7: throttle opening sensor
8: intake pipe pressure sensor
9: surge tank
10: intake pipe
11: intake manifold
12: fuel injection valve
13: crank angle sensor
14: exhaust pipe
15: starter
16: ring gear
17: ECU (Engine Control Unit)
18: battery
19: water temperature sensor

The invention claimed is:

1. An automatic stopping and restarting device of an internal combustion engine configured to automatically stop the internal combustion engine when predetermined automatic stopping conditions are established while the internal combustion engine is running and to restart the internal combustion engine when predetermined restarting conditions are established while the internal combustion engine is in an automatically stopped period, the automatic stopping and restarting device being characterized by comprising:
 a crank angle detection sensor to detect a crank angle of the internal combustion engine;
 a rotation speed computation unit to compute a rotation speed of the internal combustion engine based on the crank angle;
 a restart timing control unit to select a cylinder for restart fuel injection;
 a fuel injection control unit to restart fuel injection to the selected cylinder after the restarting conditions are established;
 an engine control unit configured to:
  predict a rotation speed of the internal combustion engine at ignition timing after the internal combustion engine is instructed to automatically stop if restarting conditions are established;
  to determine whether self-restoration of the internal combustion engine is allowed according to a comparison result of a predictive rotation speed of the internal combustion engine at the ignition timing and a pre-set self-restoration determination rotation speed; and
  to instruct the fuel injection control unit to restart fuel injection if self-restoration is allowed.

2. The automatic stopping and restarting device of an internal combustion engine according to claim 1, wherein the predictive rotation speed of the internal combustion engine at the ignition timing is an initial combustion rotation speed which is a rotation speed of the internal combustion engine at ignition timing at which initial combustion of fuel injected into a predetermined cylinder by the fuel injection control means according to timing when the restarting conditions are established takes place.

3. The automatic stopping and restarting device of an internal combustion engine according to claim 2, wherein the engine control unit computes the initial combustion rotation speed using a predictive rotation speed that takes a variation of rotation energy of the internal combustion engine into account.

4. The automatic stopping and restarting device of an internal combustion engine according to claim 3, wherein the engine control unit makes a first prediction of the predictive rotation speed using the rotation energy of the internal combustion engine after the internal combustion engine is automatically stopped as an initial value.

5. The automatic stopping and restarting device of an internal combustion engine according to claim 2, wherein the self-restoration determination rotation speed is determined on the basis of at least one of a water temperature, an intake pipe pressure, and a rotation load of the internal combustion engine.

6. The automatic stopping and restarting device of an internal combustion engine according to claim 2, wherein when the self-restoration allowance is determined that self-restoration is allowed and an increase amount of the rotation speed of the internal combustion engine from ignition timing of initial combustion is smaller than a pre-set self-restoration determination rotation speed correction necessity determination value, a necessity of a correction on the self-restoration determination rotation speed is determined and a predetermined correction coefficient is added to the self-restoration determination rotation speed.

7. The automatic stopping and restarting device of an internal combustion engine according to claim 6, wherein the self-restoration determination rotation speed correction necessity determination value is determined on the basis of at least one of a water temperature, an intake pipe pressure, and a rotation load of the internal combustion engine.

\* \* \* \* \*